United States Patent
Zhu et al.

(10) Patent No.: US 10,307,999 B2
(45) Date of Patent: Jun. 4, 2019

(54) MULTILAYER FILMS AND METHODS OF MAKING THE SAME

(71) Applicant: ExxonMobil Chemical Patents Inc., Baytown, TX (US)

(72) Inventors: Zhen-Yu Zhu, Shanghai (CN); Zhi-Yi Shen, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 131 days.

(21) Appl. No.: 15/126,373

(22) PCT Filed: Apr. 14, 2014

(86) PCT No.: PCT/CN2014/000406
§ 371 (c)(1),
(2) Date: Sep. 15, 2016

(87) PCT Pub. No.: WO2015/157876
PCT Pub. Date: Oct. 22, 2015

(65) Prior Publication Data
US 2017/0136746 A1    May 18, 2017

(51) Int. Cl.
| | | |
|---|---|---|
| *B32B 27/32* | (2006.01) | |
| *B32B 27/08* | (2006.01) | |
| *B32B 27/34* | (2006.01) | |
| *B32B 27/36* | (2006.01) | |
| *B29C 47/00* | (2006.01) | |
| *B29C 47/06* | (2006.01) | |
| *B29C 47/60* | (2006.01) | |
| *B29C 47/82* | (2006.01) | |
| *B29C 47/88* | (2006.01) | |
| *B32B 37/14* | (2006.01) | |

(52) U.S. Cl.
CPC .......... *B32B 27/32* (2013.01); *B29C 47/0026* (2013.01); *B29C 47/0057* (2013.01); *B29C 47/065* (2013.01); *B29C 47/6087* (2013.01); *B29C 47/822* (2013.01); *B29C 47/825* (2013.01); *B29C 47/8825* (2013.01); *B29C 47/8835* (2013.01); *B32B 27/08* (2013.01); *B32B 27/327* (2013.01); *B32B 27/34* (2013.01); *B32B 27/36* (2013.01); *B32B 37/14* (2013.01); *B29C 2947/926* (2013.01); *B29C 2947/92704* (2013.01); *B32B 2270/00* (2013.01); *B32B 2307/518* (2013.01); *B32B 2307/72* (2013.01); *B32B 2553/00* (2013.01)

(58) Field of Classification Search
CPC .............................. B32B 27/32; B32B 27/327
See application file for complete search history.

(56) References Cited

U.S. PATENT DOCUMENTS

| | | | |
|---|---|---|---|
| 7,951,873 B2 | 5/2011 | Best et al. | |
| 8,586,676 B2 | 11/2013 | Van Loon et al. | |
| 2010/0143734 A1 | 6/2010 | McAllister et al. | |
| 2012/0100356 A1* | 4/2012 | Ohlsson | B32B 27/20 428/213 |
| 2012/0196102 A1 | 8/2012 | Cortes | |
| 2013/0211008 A1 | 8/2013 | Shirodkar et al. | |
| 2013/0212983 A1 | 8/2013 | Bender et al. | |
| 2014/0072787 A1 | 3/2014 | Gargalaka, Jr. et al. | |
| 2014/0127489 A1* | 5/2014 | Pavlik | B32B 27/32 428/218 |

FOREIGN PATENT DOCUMENTS

WO    2014/042898    3/2014

* cited by examiner

*Primary Examiner* — Gregory Listvoyb

(57) ABSTRACT

Disclosed are multilayer films which can provide desired low-temperature bag drop performance suited for laminate freezer film packaging.

8 Claims, 4 Drawing Sheets

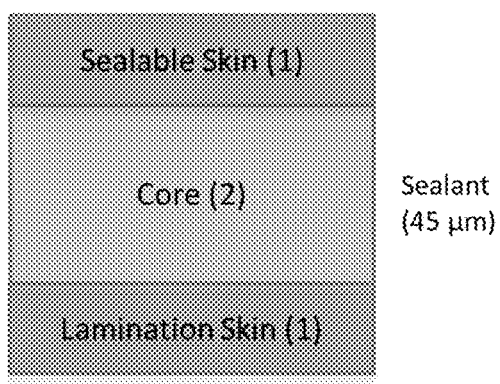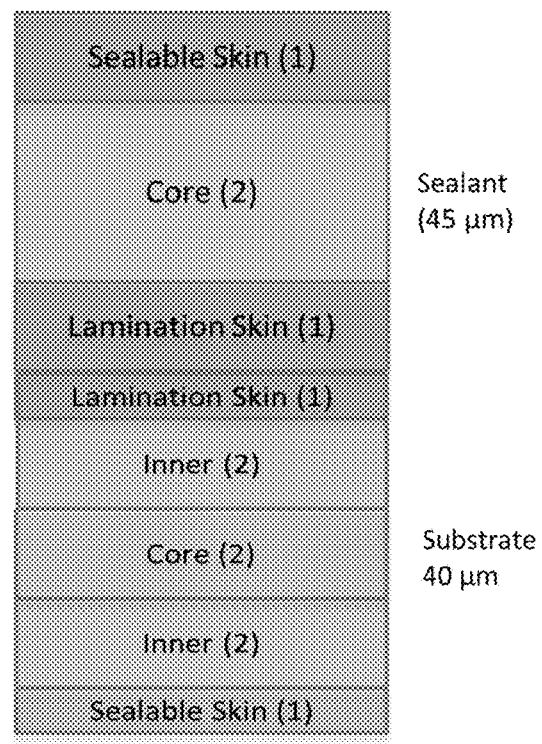
Fig. 1a
Fig. 1b
Fig. 1

MULTILAYER FILMS AND METHODS OF MAKING THE SAME

FIELD OF THE INVENTION

This invention relates to films, and in particular, to multilayer films comprising polyethylene, methods for making such films, and packages made therefrom.

BACKGROUND OF THE INVENTION

Laminate films are widely used in a variety of packaging applications. Good mechanical properties such as elongation, tensile strength, dart impact strength, and puncture resistance are desired to ensure package integrity, especially during packaging and transportation. In flexible laminate film structures, a sealant film is adhered to a substrate film commonly made of biaxially oriented polyester, biaxially oriented polypropylene, or biaxially oriented polyamide. Multilayer structures have been developed for use in sealant films which has tremendously improved the mechanical properties of sealant films relative to those made with the same composition in a monolayer construction.

Ethylene polymers, such as low density polyethylene (LDPE), linear low density polyethylene (LLDPE) prepared by Ziegler-Natta catalyst in a gas phase process, and blends thereof are generally employed in the art to form a sealant film. While such ethylene polymers work reasonably well because they provide relatively low-cost solutions, their properties render them less preferred than other polyethylenes for a number of applications. Efforts to address disadvantages caused by LDPE and LLDPE include incorporating metallocene polyethylenes (mPEs) in sealant films. However, whatever progress a sealant film has gained in terms of mechanical properties by the above solutions, once a sealant film is laminated to a substrate film, the resulting characteristics of a laminate film, depending upon the specific substrate film used, reflect very limited improvements. Therefore, it is difficult for laminate film manufacturers to achieve significant improvements in mechanical properties by exploring alternatives in sealant films.

WO 2014/042898 provides ethylene-based copolymers, particularly ethylene-based polymers having about 80.0 to 99.0 wt % of polymer units derived from ethylene and about 1.0 to about 20.0 wt % of polymer units derived from one or more $C_3$ to $C_{20}$ α-olefin comonomers; the ethylene-based polymer having a local maximum loss angle at a complex modulus, G*, of $2.50 \times 10^4$ to $1.00 \times 10^6$ Pa and a local minimum loss angle at a complex modulus, G*, of $1.00 \times 10^4$ to $3.00^* \times 10^4$ Pa. This patent application also includes articles, such as films, produced from such polymers and methods of making such articles.

U.S. Patent Publication No. 2013/211008 discloses polyethylene compositions comprising one or more ethylene polymers and one or more dendritic hydrocarbon polymer modifiers, in particular, this patent application further relates to polyethylene blends comprising one or more ethylene polymers and one or more dendritic hydrocarbon polymer modifiers, wherein the modifier has: 1) a g' value less than 0.75; 2) a Cayley tree topology with a layer number of 2 or more; and 3) an average $M_w$ between the branch points of 1,500 g/mol or more.

U.S. Patent Publication No. 2012/0100356 relates to a multilayer blown film with improved strength or toughness comprising a layer comprising a metallocene polyethylene (mPE) having a high melt index ratio (MIR), a layer comprising an mPE having a low MIR, and a layer comprising a HDPE, and/or LDPE. Other embodiments have skin layers and a plurality of sublayers. At least one sublayer includes an mPE, and at least one additional sublayer includes HDPE and/or LDPE. The mPE has a density from about 0.910 to about 0.945 g/cm3, MI from about 0.1 to about 15, and melt index ratio (MIR) from about 15 to 25 (low-MIR mPE) and/or from greater than 25 to about 80 (high-MR mPE). The process is related to supplying respective melt streams for coextrusion at a multilayer die to form a blown film having the inner and outer skin layers and a plurality of sublayers, wherein the skin layers and at least one of the sublayers comprise mPE and at least one of the sublayers comprise HDPE, LDPE or both. Draw-down, blow-up ratios and freeze-line distance from the die are controlled to facilitate a high production rate.

U.S. Pat. No. 8,586,676 provides a polymer composition and articles made therefrom. The composition includes: (a) a polyethylene having (i) at least 50 wt % ethylene moieties; and (ii) up to 50 wt % of a $C_3$ to $C_{20}$ comonomer moieties, a density of about 0.860 to about 0.965 g/cm$^3$, a melt index of about 0.1 to about 10.0 g/10 min and a branching index of about 0.96 to about 1.0; and (b) a polyethylene having: (i) at least 65 wt % ethylene moieties; and (ii) up to 35 wt % of a $C_3$ to $C_{20}$ comonomer moieties, the wt % s based upon the total weight of the latter polyethylene, a density of about 0.905 to about 0.945 g/cm$^3$, a melt index (MI) of about 0.1 to about 10.0 g/10 min, and a branching index (g') of about 0.7 to about 0.95.

Numerous attempts have been made to improve mechanical properties of laminated films by modifying compositions of the sealant films to be laminated to substrate films, yet a need for a sealant film to better overcome the counteracting effect that the substrate film places on the formed laminate film remains. Applicant has found that such objective can be achieved by applying a polyethylene comprising a copolymer derived from ethylene and one or more $C_3$ to $C_{20}$ α-olefin comonomers in each of the two outer layers and the core layer, particularly in a blend with another polyethylene at a certain ratio, to prepare a multilayer film. When laminated to a substrate film, the multilayer film made of the above composition, even at a thinner gauge, can show a remarkable advantage in low-temperature bag drop performance over a conventional multilayer film. This makes the inventive multilayer film well suited for specific packaging applications such as a freezer film. As an indicator for the combined effect of multiple mechanical properties, including tensile strength at break, dart impact strength, puncture resistance and tear resistance, this enhanced bag drop performance may reverse the perception about the limit of achievable mechanical properties of laminate films. Therefore, by adjusting compositions in different layers with the currently available selection of ethylene polymers, a laminate structure with the inventive film can be produced to provide desired mechanical properties independently of the chosen substrate film.

SUMMARY OF THE INVENTION

Provided are multilayer films comprising polyethylene, methods for making such films, and packages made therefrom.

In one embodiment, the present invention encompasses a multilayer film comprising two outer layers and a core layer between the two outer layers, wherein each of the two outer layers and the core layer comprises a first polyethylene derived from ethylene and one or more $C_3$ to $C_{20}$ α-olefin comonomers, wherein the first polyethylene is a metallocene polyethylene (mPE) having a density of about 0.910 to about 0.940 g/cm$^3$, a melt index (MI), I$_{2.16}$, of about 0.1 to about 15, a molecular weight distribution (MWD) of about 1.5 to about 5.5, and a melt index ratio (MIR), I$_{2.16}$/I$_{2.16}$, of about 10 to about 25; wherein the multilayer film has at least one of the following properties: (i) a non-breakage rate (EMC method) of about 60% to about 100% when laminated to a polyester substrate film; and (ii) a non-breakage rate (EMC method) of about 60% to about 100% when laminated to a polyethylene substrate film.

In another embodiment, the present invention relates to a method for making a multilayer film, comprising the steps of: (a) preparing two outer layers and a core layer between the two outer layers, wherein each of the two outer layers and the core layer comprises a first polyethylene derived from ethylene and one or more C$_3$ to C$_{20}$ α-olefin comonomers, wherein the first polyethylene is an mPE having a density of about 0.910 to about 0.940 g/cm$^3$, an MI, I$_{2.16}$, of about 0.1 to about 15, an MWD of about 1.5 to about 5.5, and an MIR, I$_{2.16}$/I$_{2.16}$, of about 10 to about 25; and (b) forming a film comprising the layers in step (a); wherein the multilayer film has at least one of the following properties: (i) a non-breakage rate (EMC method) of about 60% to about 100% when laminated to a polyester substrate film; and (ii) a non-breakage rate (EMC method) of about 60% to about 100% when laminated to a polyethylene substrate film.

Preferably, at least one of the two outer layers further comprises a second polyethylene derived from ethylene and one or more C$_3$ to C$_{20}$ α-olefin comonomers, wherein the second polyethylene has a density of about 0.910 to about 0.945 g/cm$^3$, an MI, I$_{2.16}$, of about 0.1 to about 15, an MWD of about 2.5 to about 5.5, and an MIR, I$_{2.16}$/I$_{2.16}$, of greater than 25 to about 100. Preferably, the core layer further comprises a third polyethylene having a density of more than 0.940 g/cm$^3$.

Also provided are packages comprising any of the multilayer films described herein or made according to any method disclosed herein.

BRIEF DESCRIPTION OF THE DRAWINGS

FIG. 1 depicts a schematic representation of film structures for the inventive films in Examples 1 to 3 (without a substrate film) and in Example 4 (with a polyethylene substrate film), respectively.

DETAILED DESCRIPTION OF THE PRESENT INVENTION

Figure 2:
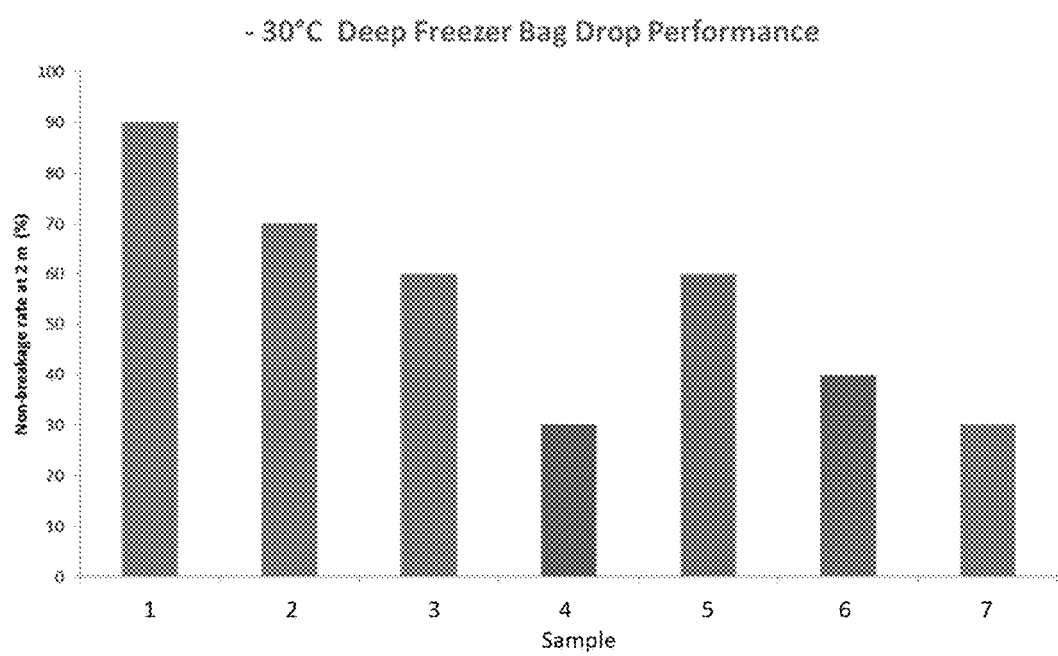
FIG. 2 depicts bag drop performance at (−30° C., 2 m) for each of the samples in Example 1.

Various specific embodiments, versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a composition containing one or more polyethylene components.

As used herein, when a polymer is referred to as comprising a monomer, the monomer is present in the polymer in the polymerized form of the monomer or in the derivative form of the monomer.

As used herein, when a polymer is said to comprise a certain percentage, wt %, of a monomer, that percentage of monomer is based on the total amount of monomer units in the polymer.

For purposes of this invention and the claims thereto, an ethylene polymer having a density of 0.86 g/cm$^3$ or less is referred to as an "ethylene elastomer"; an ethylene polymer having a density of more than 0.86 to less than 0.910 g/cm$^3$ is referred to as an "ethylene plastomer"; an ethylene polymer having a density of 0.910 to 0.940 g/cm$^3$ is referred to as a "low density polyethylene" (LDPE); and an ethylene polymer having a density of more than 0.940 g/cm$^3$ is referred to as a "high density polyethylene" (HDPE).

Polyethylene having a density of 0.890 to 0.930 g/cm$^3$, typically from 0.915 to 0.930 g/cm$^3$, that is linear and does not contain long-chain branching is referred to as "linear low density polyethylene" (LLDPE) and can be produced with conventional Ziegler-Natta catalysts, vanadium catalysts, or with metallocene catalysts in gas phase reactors and/or in slurry reactors and/or with any of the disclosed catalysts in solution reactors. "Linear" means that the polyethylene has no or only a few long-chain branches, typically referred to as a g'vis of 0.97 or above, preferably 0.98 or above.

As used herein, "core" layer, "outer" layer, and "inner" layer are merely identifiers used for convenience, and shall not be construed as limitation on individual layers, their relative positions, or the laminated structure, unless otherwise specified herein.

As used herein, "first" polyethylene, "second" polyethylene, and "third" polyethylene are merely identifiers used for convenience, and shall not be construed as limitation on individual polyethylene, their relative order, or the number of polyethylenes used, unless otherwise specified herein.

As used herein, "bag drop performance" refers to the capability of a package bag to withstand the sudden shock resulting from a free fall in accordance with ASTM D 5276-98 which is incorporated by references. The low-temperature bag drop performance is measured herein based on ASTM D 5276-98 at a height of two meters with bag samples stored in the deep freezer at −30° C. for two days prior to test and is represented by a non-breakage rate of the number of broken bag samples compared to a total of ten tested bag samples for each film formulation, which method is specifically developed by Applicant and is herein referred to as the "EMC method".

Bag drop performance refers to two different substrate films, a polyester substrate film and a polyethylene substrate film, respectively. Bag samples are prepared by laminate films formed with these two substrate films accordingly. As used herein, a polyester substrate film refers to a 12 μm substrate film of neat biaxially oriented polyester, while a polyethylene substrate film refers to a 40 μm five-layer substrate film with a formulation as shown in Table 4.

As used herein, film layers that are the same in composition and in thickness are referred to as "identical" layers.

The present invention relates to a multilayer film comprising two outer layers and a core layer between the two outer layers, wherein each of the two outer layers and the core layer comprises a first polyethylene derived from ethylene and one or more $C_3$ to $C_{20}$ α-olefin comonomers, wherein the first polyethylene is an mPE having a density of about 0.910 to about 0.940 g/cm$^3$, an MI, $I_{2.16}$, of about 0.1 to about 15, an MWD of about 1.5 to about 5.5, and an MIR, $I_{21.6}/I_{2.16}$, of about 10 to about 25; wherein the multilayer film has at least one of the following properties: (i) a non-breakage rate (EMC method) of about 60% to about 100% when laminated to a polyester substrate film; and (ii) a non-breakage rate (EMC method) of about 60% to about 100% when laminated to a polyethylene substrate film. Preferably, at least one of the two outer layers further comprises a second polyethylene derived from ethylene and one or more $C_3$ to $C_{20}$ α-olefin comonomers, wherein the second polyethylene has a density of about 0.910 to about 0.945 g/cm$^3$, an MI, $I_{2.16}$, of about 0.1 to about 15, an MWD of about 2.5 to about 5.5, and an MIR, $I_{21.6}/I_{2.16}$, of greater than 25 to about 100. Preferably, the core layer further comprises a third polyethylene having a density of more than 0.940 g/cm$^3$.

Ethylene Polymers

In one aspect of the invention, the ethylene polymers that can be used for the multilayer film described herein are selected from ethylene homopolymers, ethylene copolymers, and compositions thereof. Useful copolymers comprise one or more comonomers in addition to ethylene and can be a random copolymer, a statistical copolymer, a block copolymer, and/or compositions thereof. The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the ethylene polymers are made by the catalysts, activators and processes described in U.S. Pat. Nos. 6,342,566; 6,384,142; and 5,741,563; and WO 03/040201 and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

Ethylene polymers that are useful in this invention include those sold by ExxonMobil Chemical Company in Houston Tex., including HDPE, LLDPE, and LDPE; and those sold under the ENABLE™, EXACT™, EXCEED™, ESCORENE™, EXXCO™, ESCOR™ PAXON™, and OPTEMA™ tradenames.

Preferred ethylene homopolymers and copolymers useful in this invention typically have one or more of the following properties:

1. an $M_w$ of 20,000 g/mol or more, 20,000 to 2,000,000 g/mol, preferably 30,000 to 1,000,000, preferably 40,000 to 200,000, preferably 50,000 to 750,000, as measured by size exclusion chromatography; and/or 2. an $M_w/M_n$ of 1 to 40, preferably 1.6 to 20, or 8 to 25, more preferably 1.8 to 10, more preferably 1.8 to 4, as measured by size exclusion chromatography; and/or 3. a $T_m$ of 30° C. to 150° C., preferably 30° C. to 140° C., preferably 50° C. to 140° C., more preferably 60° C. to 135° C., as determined based on ASTM D3418-03; and/or 4. a crystallinity of 5% to 80%, preferably 10% to 70%, more preferably 20% to 60%, preferably at least 30%, or at least 40%, or at least 50%, as determined based on ASTM D3418-03; and/or 5. a heat of fusion of 300 J/g or less, preferably 1 to 260 J/g, preferably 5 to 240 J/g, preferably 10 to 200 J/g, as determined based on ASTM D3418-03; and/or 6. a crystallization temperature ($T_c$) of 15° C. to 130° C., preferably 20° C. to 120° C., more preferably 25° C. to 110° C., preferably 60° C. to 125° C., as determined based on ASTM D3418-03; and/or 7. a heat deflection temperature of 30° C. to 120° C., preferably 40° C. to 100° C., more preferably 50° C. to 80° C. as measured based on ASTM D648 on injection molded flexure bars, at 66 psi load (455 kPa); and/or 8. a Shore hardness (D scale) of 10 or more, preferably 20 or more, preferably 30 or more, preferably 40 or more, preferably 100 or less, preferably from 25 to 75 (as measured based on ASTM D 2240); and/or 9. a percent amorphous content of at least 50%, preferably at least 60%, preferably at least 70%, more preferably between 50% and 95%, or 70% or less, preferably 60% or less, preferably 50% or less as determined by subtracting the percent crystallinity from 100.

The polyethylene may be an ethylene homopolymer, such as HDPE. In one embodiment, the ethylene homopolymer has a molecular weight distribution ($M_w/M_n$) or (MWD) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry is as specified under the ASTM D790 section "Molding Materials (Thermoplastics and Thermosets)," and the support span is 2 inches (5.08 cm)) of the ethylene polymer falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The melt index (MI) of preferred ethylene homopolymers range from 0.05 to 800 dg/min in one embodiment, and from 0.1 to 100 dg/min in another embodiment, as measured based on ASTM D1238 (190° C., 2.16 kg).

In a preferred embodiment, the polyethylene comprises less than 20 mol % propylene units (preferably less than 15 mol %, preferably less than 10 mol %, preferably less than 5 mol %, and preferably 0 mol % propylene units).

In another embodiment of the invention, the ethylene polymer useful herein is produced by polymerization of ethylene and, optionally, an alpha-olefin with a catalyst having, as a transition metal component, a bis(n-$C_{3-4}$ alkyl cyclopentadienyl) hafnium compound, wherein the transition metal component preferably comprises from about 95 mol % to about 99 mol % of the hafnium compound as further described in U.S. Pat. No. 9,956,088.

In another embodiment of the invention, the ethylene polymer is an ethylene copolymer, either random or block, of ethylene and one or more comonomers selected from $C_3$ to $C_{20}$ α-olefins, typically from $C_3$ to $C_{10}$ α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from up to 40 wt %, more preferably from 0.5 wt % to 30 wt %, more preferably from 2 wt % to 30 wt %, more preferably from 5 wt % to 20 wt %, based on the total weight of the ethylene copolymer.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In a preferred embodiment, one or more dienes are present in the ethylene polymer at up to 10 wt %, preferably at 0.00001 wt % to 2 wt %, preferably 0.002 wt % to 1 wt %, even more preferably 0.003 wt % to 0.5 wt %, based upon the total weight of the ethylene polymer. In some embodiments, diene is added to the polymerization in an amount of from an upper limit of 500 ppm, 400 ppm, or 300 ppm to a lower limit of 50 ppm, 100 ppm, or 150 ppm.

Preferred ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer, preferably a $C_4$ to $C_8$ comonomer, preferably hexene or octene, based upon the weight of the copolymer. Preferably these polymers are metallocene polyethylenes (mPEs).

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Houston, Tex. under the tradename EXCEED™ Polyethylene or ENABLE™ Polyethylene.

In a class of embodiments, the multilayer film of the present invention comprises a first polyethylene which is an mPE, as an ethylene polymer defined herein, in each of the two outer layers and the core layer. In various embodiments, the first polyethylene may have one or more of the following properties:

(a) a density (sample prepared according to ASTM D-4703, and the measurement according to ASTM D-1505) of about 0.910 to 0.940 g/cm³, or about 0.912 to about 0.935 g/cm³;

(b) a Melt Index ("MI", $I_{2.16}$, ASTM D-1238, 2.16 kg, 190° C.) of about 0.1 to about 15 g/10 min, or about 0.5 to about 10 g/10 min, or about 1 to about 5 g/10 min;

(c) a Melt Index Ratio ("MIR", $I_{2.16}$ (190° C., 2.16 kg)/$I_{2.16}$ (190° C., 2.16 kg)) of about 10 to about 25, or about 15 to about 20, or about 16 to about 18;

(d) a Composition Distribution Breadth Index ("CDBI") of up to about 85%, or up to about 75%, or about 5 to about 85%, or 10 to 75%. The CDBI may be determined using techniques for isolating individual fractions of a sample of the resin. The preferred technique is Temperature Rising Elution Fraction ("TREF"), as described in Wild, et al., J. Poly. Sci., Poly. Phys. Ed., Vol. 20, p. 441 (1982), which is incorporated herein for purposes of U.S. practice;

(e) a molecular weight distribution ("MWD") of about 1.5 to about 5.5; MWD is measured using a gel permeation chromatograph ("GPC") equipped with a differential refractive index ("DRI") detector; and/or (f) a branching index of about 0.9 to about 1.0, or about 0.96 to about 1.0, or about 0.97 to about 1.0. Branching Index is an indication of the amount of branching of the polymer and is defined as g'=$[Rg]^2_{br}/[Rg]_{lin}$. "Rg" stands for Radius of Gyration, and is measured using a Waters 150 gel permeation chromatograph equipped with a Multi-Angle Laser Light Scattering ("MALLS") detector, a viscosity detector and a differential refractive index detector. "$[Rg]_{br}$" is the Radius of Gyration for the branched polymer sample and "$[Rg]_{lin}$" is the Radius of Gyration for a linear polymer sample.

The first polyethylene is not limited by any particular method of preparation and may be formed using any process known in the art. For example, the first polyethylene may be formed using gas phase, solution, or slurry processes.

In one embodiment, the first polyethylene is formed in the presence of a metallocene catalyst. For example, the first polyethylene may be an mPE produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. mPEs useful as the first polyethylene include those commercially available from ExxonMobil Chemical Company in Houston, Tex., such as those sold under the trade designation EXCEED™ PE.

In accordance with an embodiment, the multilayer film described herein further comprises a second polyethylene, as an ethylene polymer defined herein, in at least one of the outer layers. In various embodiments, the second polyethylene may have one or more of the following properties:

(a) a density (sample prepared according to ASTM D-4703, and the measurement according to ASTM D-1505) of about 0.910 to about 0.945 g/cm$^3$, or about 0.915 to about 0.940 g/cm$^3$;

(b) a Melt Index ("MI", $I_{2.16}$, ASTM D-1238, 2.16 kg, 190° C.) of about 0.1 to about 15 g/10 min, or about 0.1 to about 10 g/10 min, or about 0.1 to about 5 g/10 min;

(c) a Melt Index Ratio ("MIR", $I_{21.6}$ (190° C., 2.16 kg)/$I_{2.16}$ (190° C., 2.16 kg)) of greater than 25 to about 100, or greater than 30 to about 90, or greater than 35 to about 80;

(d) a Composition Distribution Breadth Index ("CDBI", determined according to the procedure disclosed herein) of greater than about 50%, or greater than about 60%, or greater than 75%, or greater than 85%;

(e) a molecular weight distribution ("MWD") of about 2.5 to about 5.5; MWD is measured according to the procedure disclosed herein; and/or (f) a branching index ("g", determined according to the procedure described herein) of about 0.5 to about 0.97, or about 0.7 to about 0.95.

The second polyethylene is not limited by any particular method of preparation and may be formed using any process known in the art. For example, the second polyethylene may be formed using gas phase, solution, or slurry processes.

In one embodiment, the second polyethylene is formed in the presence of a Ziegler-Natta catalyst. In another embodiment, the second polyethylene is formed in the presence of a single-site catalyst, such as a metallocene catalyst (such as any of those described herein). Ethylene polymers useful as the second polyethylene in this invention include those disclosed in U.S. Pat. No. 6,255,426, entitled "Easy Processing Linear Low Density Polyethylene" (Lue), which is hereby incorporated by reference for this purpose, and include those commercially available from ExxonMobil Chemical Company in Houston, Tex., such as those sold under the trade designation ENABLE™.

In another preferred embodiment, the multilayer film of the present invention may further comprise in the core layer a third polyethylene, as an ethylene polymer defined herein, having a density of more than 0.940 g/cm$^3$, preferably about 0.940 g/cm$^3$ to about 0.965 g/cm$^3$. The third polyethylene is typically prepared with either Ziegler-Natta or chromium-based catalysts in slurry reactors, gas phase reactors, or solution reactors. Ethylene polymers useful as the third polyethylene in this invention include those commercially available from ExxonMobil Chemical Company in Houston, Tex., such as HDPE.

The two outer layers and the core layer of the multilayer film can each include the first polyethylene optionally in a blend with one or more other polymers, such as ethylene polymers defined herein, which blend is referred to as ethylene polymer composition. In particular, the ethylene polymer compositions described herein may be physical blends or in situ blends of more than one type of ethylene polymer or compositions of ethylene polymers with polymers other than ethylene polymers where the ethylene polymer component is the majority component, e.g., greater than 50 wt % of the total weight of the composition. Preferably, the ethylene polymer composition is a blend of two polyethylenes with different densities. Preferably, at least one of the outer layers of the multilayer film of the present invention comprises the second polyethylene described herein, present in an amount of no more than about 50 wt %, no more than about 45 wt %, no more than about 40 wt %, no more than about 35 wt %, no more than about 30 wt %, no more than about 25 wt %, no more than about 20 wt %, no more than about 15 wt %, no more than about 10 wt %, or no more than about 5 wt %, based on the total weight of polymer in the outer layer. Preferably, the core layer of the multilayer film of the present invention comprises the third polyethylene described herein present in an amount of no more than about 80 wt %, no more than about 70 wt %, no more than about 60 wt %, no more than about 50 wt %, no more than about 40 wt %, no more than about 30 wt %, no more than about 20 wt %, or no more than about 10 wt %, based on the total weight of polymer in the core layer. Preferably, the core layer has an average density higher than that of at least one of the outer layer.

It has been surprisingly discovered that use of the first polyethylene described herein, to prepare a multilayer film, may significantly aid in modifying mechanical properties of a laminate structure formed by the multilayer film. Especially, when the first polyethylene is combined in at least one of the outer layers with the second polyethylene described herein, and in the core layer with the third polyethylene described herein, to prepare the inventive film, low-temperature bag drop performance of a package bag comprising the inventive film can be strengthened without improvement being largely offset by the substrate film as normally anticipated. Thus, the inventive film can provide desired freezer film packages where superior low-temperature bag drop performance is expected, thus, further broadening application of polyethylene in laminate films.

Film Structures

The multilayer film of the present invention may further comprise additional layer(s), which may be any layer typically included in multilayer film constructions. For example, the additional layer(s) may be made from:

1. Polyolefins. Preferred polyolefins include homopolymers or copolymers of $C_2$ to $C_{40}$ olefins, preferably $C_2$ to $C_{20}$ olefins, preferably a copolymer of an α-olefin and another olefin or α-olefin (ethylene is defined to be an α-olefin for purposes of this invention). Preferably homopolyethylene, homopolypropylene, propylene copolymerized with ethylene and/or butene, ethylene copolymerized with one or more of propylene, butene or hexene, and optional dienes. Preferred examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and compositions of thermoplastic polymers and elastomers, such as, for example, thermoplastic elastomers and rubber toughened plastics.

2. Polar polymers. Preferred polar polymers include homopolymers and copolymers of esters, amides, acetates, anhydrides, copolymers of a $C_2$ to $C_{20}$ olefin, such as ethylene and/or propylene and/or butene with one or more polar monomers, such as acetates, anhydrides, esters, alcohol, and/or acrylics. Preferred examples include polyesters, polyamides, ethylene vinyl acetate copolymers, and polyvinyl chloride.

3. Cationic polymers. Preferred cationic polymers include polymers or copolymers of geminally disubstituted olefins, α-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred styrenic monomers include styrene, alkyl styrene, para-alkyl styrene, α-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

4. Miscellaneous. Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbond fibers, and nonwovens (particularly polypropylene spunbond fibers or nonwovens), and substrates coated with inks, dyes, pigments, and the like.

In particular, a multilayer film can also include layers comprising materials such as ethylene vinyl alcohol (EVOH), polyamide (PA), or polyvinylidene chloride (PVDC), so as to obtain barrier performance for the film where appropriate.

In one aspect of the invention, the multilayer film described herein may be produced in a stiff oriented form (often referred to as "pre-stretched" by persons skilled in the art) and may be useful for laminating to inelastic materials, such as polyethylene films, biaxially oriented polyester (e.g., polyethylene terephthalate (PET)) films, biaxially oriented polypropylene (BOPP) films, biaxially oriented polyamide (nylon) films, foil, paper, board, or fabric substrates, or may further comprise one of the above substrate films to form a laminate structure.

In an embodiment, the multilayer film further comprises a substrate film comprising: (a) two substrate outer layers and a substrate core layer between the two substrate outer layers, wherein each of the two substrate outer layers and the substrate core layer comprises a polyethylene derived from ethylene and one or more $C_3$ to $C_{20}$ α-olefin comonomers, wherein the polyethylene has a density of about 0.910 to about 0.940 $g/cm^3$, an MI, $I_{2.16}$, of about 0.1 to about 15, an MWD of about 1.5 to about 5.5, and an MIR, $I_{2.16}/I_{2.16}$, of about 10 to about 50; and (b) two substrate inner layers, each having a density of at least about 0.003 $g/cm^3$ higher than that of the outer layer on the same side of the core layer, wherein each substrate inner layer is between the substrate core layer and each substrate outer layer. Preferably, the two substrate outer layers each further comprises a polyethylene derived from ethylene and one or more $C_3$ to $C_{20}$ α-olefin comonomers, wherein the polyethylene has a density of about 0.910 to about 0.945 $g/cm^3$, an MI, $I_{2.16}$, of about 0.1 to about 15, an MWD of about 2.5 to about 5.5, and an MIR, $I_{2.16}/I_{2.16}$, of about 25 to about 100. In another preferred embodiment, the multilayer film further comprises a substrate film comprising at least one of biaxially oriented polyester, biaxially oriented polypropylene, and biaxially oriented polyamide. These multilayer films can optionally include additional barrier layers such as an aluminium barrier.

The thickness of the multilayer films may range from 5 to 200 μm in general and is mainly determined by the intended use and properties of the film. Stretch films may be thin; those for shrink films or heavy duty bags are much thicker. Conveniently the film has a thickness of from 5 to 200 μm, preferably from 10 to 150 μm, and more preferably from 20 to 90 μm. The thickness of each of the outer layers may be at least 7% of the total thickness, preferably from 10 to 40%. Preferably, the volume (thickness) ratio between one of the outer layers and the core layer is about 1:1 to about 1:4, for example, about 1:1, about 1:1.5, about 1:2, about 1:2.5, about 1:3, about 1:3.5, or about 1:4.

The multilayer film described herein may have an A/Y/A structure wherein A is an outer layer and Y is the core layer in contact with the outer layer. Suitably one or both outer layers are a skin layer forming one or both film surfaces and can serve as a lamination skin (the surface to be adhered to a substrate film) or a sealable skin (the surface to form a seal). The composition of the A layers may be the same or different, but conform to the limitations set out herein. Preferably, the A layers are identical. The film may have an A/B/X/B/A structure wherein A are outer layers and X represents the core layer and B are inner layers between the core layer and each outer layer. The composition of the B layers may also be the same or different, but conform to the limitations set out herein. The A and B layers may have the same composition or different compositions. Preferably, at least one of the B layers has a different composition with a density higher than that of the A layer.

In a preferred embodiment, the multilayer film has a three-layer A/Y/A structure, comprising: (a) two outer layers, each comprising a blend of a first and a second polyethylene, wherein the first polyethylene is present in an amount of about 60 wt % to about 80 wt %, based on total weight of polymer in the outer layer; and (b) a core layer between the two outer layers, comprising a blend of the first polyethylene and a third polyethylene, wherein the first polyethylene is present in an amount of 40 wt % to about 60 wt %, based on total weight of polymer in the core layer; wherein (i) the first polyethylene is derived from ethylene and one or more $C_3$ to $C_{20}$ α-olefin comonomers, wherein the first polyethylene is an mPE having a density of about 0.912 to about 0.935 g/cm$^3$, an MI, $I_{2.16}$, of about 1 to about 5, an MWD of about 1.5 to about 5.5, and an MIR, $I_{2.16}/I_{2.16}$, of about 10 to about 25; (ii) the second polyethylene is derived from ethylene and one or more $C_3$ to $C_{20}$ α-olefin comonomers, wherein the second polyethylene has a density of about 0.915 to about 0.940 g/cm$^3$, an MI, $I_{2.16}$, of about 0.1 to about 5, an MWD of about 2.5 to about 5.5, and an MIR, $I_{2.16}/I_{2.16}$, of greater than 25 to about 100; and (iii) the third polyethylene has a density of about 0.940 g/cm$^3$ to about 0.965 g/cm$^3$. Preferably, the volume ratio between each of the outer layers and the core layer is about 1:2.

In particular, the above three-layer film has at least one of the following properties: (i) a non-breakage rate (EMC method) of about 60% to about 100% when laminated to a polyester substrate film; and (ii) a non-breakage rate (EMC method) of about 60% to about 100% when laminated to a polyethylene substrate film.

Film Properties and Applications

The multilayer films of the present invention may be adapted to form flexible packaging films for a wide variety of applications, such as, cling film, low stretch film, non-stretch wrapping film, pallet shrink, over-wrap, agricultural, collation shrink film and laminated films, including stand-up pouches. The film structures that may be used for bags are prepared such as sacks, trash bags and liners, industrial liners, produce bags, and heavy duty bags. The film may be used in flexible packaging, food packaging, e.g., fresh cut produce packaging, frozen food packaging, bundling, packaging and unitizing a variety of products. A package comprising a multilayer film described herein can be heat sealed around package content. The film and package of the present invention can display outstanding mechanical properties as demonstrated by low-temperature bag drop performance, which is especially important for certain packaging applications, such as freezer film packages for frozen food, characterized by low-temperature toughness to protect contents.

The inventive multilayer film may have at least one of the following properties: (i) a non-breakage rate (EMC method) of about 60% to about 100% when laminated to a polyester substrate film; and (ii) a non-breakage rate (EMC method) of about 60% to about 100% when laminated to a polyethylene substrate film. Using the present invention, by modifying polyethylene compositions of the films to be laminated to a substrate film independently of the chosen substrate film, the long-standing difficulty in optimizing mechanical properties of a laminate film used for packaging applications requiring, for example, good low-temperature toughness can be well addressed.

Methods for Making the Multilayer Film

Also provided are methods for making multilayer films of the present invention. A method for making a multilayer film may comprise the steps of: (a) preparing two outer layers and a core layer between the two outer layers, wherein each of the two outer layers and the core layer comprises a first polyethylene derived from ethylene and one or more $C_3$ to $C_{20}$ α-olefin comonomers, wherein the first polyethylene is an mPE having a density of about 0.910 to about 0.940 g/cm$^3$, an MI, $I_{2.16}$, of about 0.1 to about 15, an MWD of about 1.5 to about 5.5, and an MIR, $I_{2.16}/I_{2.16}$, of about 10 to about 25; and (b) forming a film comprising the layers in step (a); wherein the multilayer film has at least one of the following properties: (i) a non-breakage rate (EMC method) of about 60% to about 100% when laminated to a polyester substrate film; and (ii) a non-breakage rate (EMC method) of about 60% to about 100% when laminated to a polyethylene substrate film.

The multilayer films described herein may be formed by any of the conventional techniques known in the art including blown extrusion, cast extrusion, co-extrusion, blow molding, casting, and extrusion blow molding.

In one embodiment of the invention, the multilayer films of the present invention may be formed by using blown techniques, i.e., to form a blown film. For example, the composition described herein can be extruded in a molten state through an annular die and then blown and cooled to form a tubular, blown film, which can then be axially slit and unfolded to form a flat film. As a specific example, blown films can be prepared as follows. The polymer composition is introduced into the feed hopper of an extruder, such as a 50 mm extruder that is water-cooled, resistance heated, and has an L/D ratio of 30:1. The film can be produced using a 28 cm W&H die with a 1.4 mm die gap, along with a W&H dual air ring and internal bubble cooling. The film is extruded through the die into a film cooled by blowing air onto the surface of the film. The film is drawn from the die typically forming a cylindrical film that is cooled, collapsed and, optionally, subjected to a desired auxiliary process, such as slitting, treating, sealing, or printing. Typical melt temperatures are from about 180° C. to about 230° C. Blown film rates are generally from about 3 to about 25 kilograms per hour per inch (about 4.35 to about 26.11 kilograms per hour per centimeter) of die circumference. The finished film can be wound into rolls for later processing. A particular blown film process and apparatus suitable for forming films according to embodiments of the present invention is described in U.S. Pat. No. 5,569,693. Of course, other blown film forming methods can also be used.

The compositions prepared as described herein are also suited for the manufacture of blown film in a high-stalk extrusion process. In this process, a polyethylene melt is fed through a gap (typically 0.5 to 1.6 mm) in an annular die attached to an extruder and forms a tube of molten polymer which is moved vertically upward. The initial diameter of the molten tube is approximately the same as that of the annular die. Pressurized air is fed to the interior of the tube to maintain a constant air volume inside the bubble. This air pressure results in a rapid 3-to-9-fold increase of the tube diameter which occurs at a height of approximately 5 to 10 times the die diameter above the exit point of the tube from the die. The increase in the tube diameter is accompanied by a reduction of its wall thickness to a final value ranging from approximately 10 to 50 μm and by a development of biaxial orientation in the melt. The expanded molten tube is rapidly cooled (which induces crystallization of the polymer), collapsed between a pair of nip rolls and wound onto a film roll.

In blown film extrusion, the film may be pulled upwards by, for example, pinch rollers after exiting from the die and is simultaneously inflated and stretched transversely sideways to an extent that can be quantified by the blow up ratio (BUR). The inflation provides the transverse direction (TD) stretch, while the upwards pull by the pinch rollers provides a machine direction (MD) stretch. As the polymer cools after exiting the die and inflation, it crystallizes and a point is reached where crystallization in the film is sufficient to prevent further MD or TD orientation. The location at which further MD or TD orientation stops is generally referred to as the "frost line" because of the development of haze at that location.

Variables in this process that determine the ultimate film properties include the die gap, the BUR and TD stretch, the take up speed and MD stretch and the frost line height. Certain factors tend to limit production speed and are largely determined by the polymer rheology including the shear sensitivity which determines the maximum output and the melt tension which limits the bubble stability, BUR and take up speed.

A laminate structure with the inventive multilayer film prepared as described herein can be formed by lamination to a substrate film as previously described herein.

Other embodiments of the present invention can include:

1. A multilayer film, comprising two outer layers and a core layer between the two outer layers, wherein each of the two outer layers and the core layer comprises a first polyethylene derived from ethylene and one or more $C_3$ to $C_{20}$ α-olefin comonomers, wherein the first polyethylene is a metallocene polyethylene (mPE) having has a density of about 0.910 to about 0.940 g/cm$^3$, a melt index (MI), $I_{2.16}$, of about 0.1 to about 15, a molecular weight distribution (MWD) of about 1.5 to about 5.5, and a melt index ratio (MIR), $I_{21.6}/I_{2.16}$, of about 10 to about 25;

wherein the multilayer film has at least one of the following properties: (i) a non-breakage rate (EMC method) of about 60% to about 100% when laminated to a polyester substrate film; and (ii) a non-breakage rate (EMC method) of about 60% to about 100% when laminated to a polyethylene substrate film.

2. The multilayer film of paragraph 1, wherein the multilayer film has at least one of the following properties: (i) a non-breakage rate (EMC method) of about 100% when laminated to a polyester substrate film; and (ii) a non-breakage rate (EMC method) of about 100% when laminated to a polyethylene substrate film.

3. The multilayer film of paragraph 1 or 2, further comprising a substrate film comprising:

(a) two substrate outer layers and a substrate core layer between the two substrate outer layers, wherein each of the two substrate outer layers and the substrate core layer comprise a polyethylene derived from ethylene and one or more $C_3$ to $C_{20}$ α-olefin comonomers, wherein the polyethylene has a density of about 0.910 to about 0.940 g/cm$^3$, an MI, $I_{2.16}$, of about 0.1 to about 15, an MWD of about 1.5 to about 5.5, and an MIR, $I_{21.6}/I_{2.16}$, of about 10 to about 50; and (b) two substrate inner layers, each having a density of at least about 0.003 g/cm$^3$ higher than that of the outer layer on the same side of the core layer, wherein each substrate inner layer is between the substrate core layer and each substrate outer layer.

4. The multilayer film of paragraph 3, wherein the two substrate outer layers each further comprises a polyethylene derived from ethylene and one or more $C_3$ to $C_{20}$ α-olefin comonomers, wherein the polyethylene has a density of about 0.910 to about 0.945 g/cm$^3$, an MI, $I_{2.16}$, of about 0.1 to about 15, an MWD of about 2.5 to about 5.5, and an MIR, $I_{21.6}/I_{2.16}$, of about 25 to about 100.

5. The multilayer film of any of paragraphs 1 to 4, further comprising a substrate film comprising at least one of biaxially oriented polyester, biaxially oriented polypropylene, and biaxially oriented polyamide.

6. The multilayer film of any of paragraphs 1 to 5, wherein at least one of the two outer layers further comprises a second polyethylene derived from ethylene and one or more $C_3$ to $C_{20}$ α-olefin comonomers, wherein the second polyethylene has a density of about 0.910 to about 0.945 g/cm$^3$, an MI, $I_{2.16}$, of about 0.1 to about 15, an MWD of about 2.5 to about 5.5, and an MIR, $I_{21.6}/I_{2.16}$, of greater than 25 to about 100.

7. The multilayer film of paragraph 6, wherein the second polyethylene is present in an amount of no more than about 50 wt %, based on total weight of polymer in the outer layer.

8. The multilayer film of any of paragraphs 1 to 7, wherein the two outer layers are identical.

9. The multilayer film of any of paragraphs 1 to 8, wherein the core layer further comprises a third polyethylene having a density of more than 0.940 g/cm$^3$.

10. The multilayer film of paragraph 9, wherein the third polyethylene is present in an amount of no more than about 80 wt %, based on total weight of polymer in the core layer.

11. The multilayer film of any of paragraphs 1 to 10, wherein the volume ratio between one of the outer layers and the core layer is about 1:1 to about 1:4.

12. A multilayer film, comprising:

(a) two outer layers, each comprising a blend of a first and a second polyethylene, wherein the first polyethylene is present in an amount of about 60 wt % to about 80 wt %, based on total weight of polymer in the outer layer; and (b) a core layer between the two outer layers, comprising a blend of the first polyethylene and a third polyethylene, wherein the first polyethylene is present in an amount of 40 wt % to about 60 wt %, based on total weight of polymer in the core layer;

wherein (i) the first polyethylene is derived from ethylene and one or more $C_3$ to $C_{20}$ α-olefin comonomers, wherein the first polyethylene is an mPE having a density of about 0.912 to about 0.935 g/cm$^3$, an MI, $I_{2.16}$, of about 1 to about 5, an MWD of about 1.5 to about 5.5, and an MIR, $I_{21.6}/I_{2.16}$, of about 10 to about 25; (ii) the second polyethylene is derived from ethylene and one or more $C_3$ to $C_{20}$ α-olefin comonomers, wherein the second polyethylene has a density of about 0.915 to about 0.940 g/cm$^3$, an MI, $I_{2.16}$, of about 0.1 to about 5, an MWD of about 2.5 to about 5.5, and an MIR, $I_{21.6}/I_{2.16}$, of greater than 25 to about 100; and (iii) the third polyethylene has a density of about 0.940 g/cm$^3$ to about 0.965 g/cm$^3$.

13. The multilayer film of paragraph 12, wherein the volume ratio between each of the outer layers and the core layer is about 1:2.

14. The multilayer film of paragraph 12 or 13, wherein the multilayer film has at least one of the following properties: (i) a non-breakage rate (EMC method) of about 60% to about 100% when laminated to a polyester substrate film; and (ii) a non-breakage rate (EMC method) of about 60% to about 100% when laminated to a polyethylene substrate film.

15. A method for making a multilayer film, comprising the steps of:

(a) preparing two outer layers and a core layer between the two outer layers, wherein each of the two outer layers and the core layer comprises a first polyethylene derived from ethylene and one or more $C_3$ to $C_{20}$ α-olefin comonomers, wherein the first polyethylene is an mPE having a density of about 0.910 to about 0.940 g/cm$^3$, an MI, 12.16, of about 0.1 to about 15, an MWD of about 1.5 to about 5.5, and an MIR, $I_{21.6}/I_{2.16}$, of about 10 to about 25; and (b) forming a film comprising the layers in step (a);

wherein the multilayer film has at least one of the following properties: (i) a non-breakage rate (EMC method) of about 60% to about 100% when laminated to a polyester substrate film; and (ii) a non-breakage rate (EMC method) of about 60% to about 100% when laminated to a polyethylene substrate film.

16. The method of paragraph 15, wherein the multilayer film in step (b) is formed by blown extrusion, cast extrusion, co-extrusion, blow molding, casting, or extrusion blow molding.

17. The method of paragraph 15 or 16, wherein at least one of the two outer layers further comprises a second polyethylene derived from ethylene and one or more $C_3$ to $C_{20}$ α-olefin comonomers, wherein the second polyethylene has a density of about 0.910 to about 0.945 g/cm³, an MI, $I_{2.16}$, of about 0.1 to about 15, an MWD of about 2.5 to about 5.5, and an MIR, $I_{21.6}/I_{2.16}$, of greater than 25 to about 100.

18. The method of paragraph 17, wherein the second polyethylene is present in an amount of no more than about 50 wt %, based on total weight of polymer in the outer layer.

19. The method of any of paragraphs 15 to 18, wherein the two outer layers are identical.

20. The method of any of paragraphs 15 to 19, wherein the core layer further comprises a third polyethylene having a density of more than 0.940 g/cm³.

21. The method of paragraph 20, wherein the third polyethylene is present in an amount of no more than about 80 wt %, based on total weight of polymer in the core layer.

22. The method of any of paragraphs 15 to 21, wherein the volume ratio between one of the outer layers and the core layer is about 1:1 to about 1:4.

23. A package comprising the multilayer film of any of paragraphs 1 to 14.

EXAMPLES

The present invention, while not meant to be limited by, may be better understood by reference to the following examples and tables.

Example 1

Example 1 illustrates bag drop performance demonstrated by three three-layer samples of the inventive film (Samples 1-3) in comparison with four comparative samples (Samples 4-7) when they were all laminated to a polyester substrate film as defined herein. EXCEED™ 1018 KB mPE resin (ExxonMobil Chemical Company, Houston, Tex., USA) (MIR: 16), EXCEED™ 2018 KB mPE resin (ExxonMobil Chemical Company, Houston, Tex., USA) (MIR: 17), and EXCEED™ 1012MJ mPE resin (ExxonMobil Chemical Company, Houston, Tex., USA) (MIR: 16) were used in Samples 1-3, respectively. ENABLE™ 20-05HE mPE resin (ExxonMobil Chemical Company, Houston, Tex., USA) (MIR: 42) and ExxonMobil™ HDPE HTA 002 resin (ExxonMobil Chemical Company, Houston, Tex., USA) (density: 0.952 g/cm³) were both used in each of Samples 1-3. ExxonMobil™ LLDPE LL 1001KI $C_4$-LLDPE resin (ExxonMobil Chemical Company, Houston, Tex., USA) (prepared by Ziegler-Natta catalyst), DOWLEX™ 2045.01G $C_8$-LLDPE resin (The Dow Chemical Company, Midland, Mich., USA) (prepared by Ziegler-Natta catalyst), ELITE™ 5400GS $C_8$-mLLDPE (metallocene linear low density polyethylene) resin (The Dow Chemical Company, Midland, Mich., USA) (MIR: 30), BORSTAR™ FB2310 bimodal medium density polyethylene (MDPE) (Borealis AG, Vienna, Austria) (MIR: 99) (prepared by Ziegler-Natta catalyst), and ExxonMobil™ LDPE LD 150AC LDPE resin (ExxonMobil Chemical Company, Houston, Tex., USA) were used in Samples 4-7 with detailed formulations as shown in Table 1 as comparative films. The POLYBATCH™ CE 505E slip agent (A. Schulman, Fairlawn, Ohio, USA) was used in Samples 3 and 4. All samples were prepared on W&H coextrusion blown film line with a BUR of 2.5 and those with a three-layer A/Y/A structure were prepared at a layer volume ratio of 1:2:1. A schematic representation of film structures for Samples 1-3 is shown in FIG. 1a. Structure-wise formulations and thickness (without the polyester substrate film) of the film samples are listed below in Table 1. The non-breakage rate was measured by EMC method as described herein. The results are depicted in FIG. 2.

As shown in FIG. 2, by reaching a non-breakage rate of at least 60%, Samples 1-3 of the inventive film, even at a thinner gauge, exceeded in low-temperature bag drop performance, compared with that achieved with conventional $C_4$-LLDPE (non-metallocene catalyzed), $C_8$-LLDPE (non-metallocene catalyzed) and $C_8$-mLLDPE (MIR of which outside the range of the first polyethylene's MIR) based comparative films. Particularly, without being bound by theory, it is believed that the presence of the EXCEED™ mPE resins, functioning as the first polyethylene described herein, contributes to mitigation of the counteracting effect that a substrate film has and improvement in mechanical properties of a laminate structure. Particularly, with a non-breakage rate as high as 90% obtained by the film composition of Sample 1, high quality of low-temperature packages, such as a freezer film, can be expected.

TABLE 1

Structure-wise formulations (wt %) and thickness (μm) for film samples of Example 1

| Sample No. | Thickness (μm) | Lamination skin | Core | Sealable skin |
|---|---|---|---|---|
| 1 | 45 | EXCEED ™ 1018KB (75) | EXCEED ™ 1018KB (60) | EXCEED ™ 1018KB (75) |
|   |   | ENABLE ™ 20-05HE (25) | ExxonMobil ™ HDPE HTA 002 (40) | ENABLE ™ 20-05HE (25) |
| 2 | 45 | EXCEED ™ 2018KB (75) | EXCEED ™ 2018KB (60) | EXCEED ™ 2018KB (75) |
|   |   | ENABLE ™ 20-05HE (25) | ExxonMobil ™ HDPE HTA 002 (40) | ENABLE ™ 20-05HE (25) |
| 3 | 45 | EXCEED ™ 1012MJ (74) | EXCEED ™ 1012MJ (60) | EXCEED ™ 1012MJ (74) |
|   |   | ENABLE ™ 20-05HE (25) | ExxonMobil ™ HDPE HTA 002 (40) | ENABLE ™ 20-05HE (25) |
|   |   | POLYBATCH ™ CE 505E (1) |   | POLYBATCH ™ CE 505E (1) |
| 4 | 50 | ELITE ™ 5400GS (90) | BORSTAR ™ FB2310 (99) | ELITE ™ 5400GS (90) |
|   |   | ExxonMobil ™ LDPE LD 150AC (10) | POLYBATCH ™ CE 505E (1) | ExxonMobil ™ LDPE LD 150AC (10) |

TABLE 1-continued

Structure-wise formulations (wt %) and thickness (μm) for film samples of Example 1

| Sample No. | Thickness (μm) | Lamination skin | Core | Sealable skin |
|---|---|---|---|---|
| 5 | 60 | DOWLEX ™ 2045.01G (90) ExxonMobil ™ LDPE LD 150AC (10) | DOWLEX ™ 2045.01G (60) ExxonMobil ™ LDPE LD 150AC (20) ExxonMobil ™ HDPE HTA 002 (20) | DOWLEX ™ 2045.01G (90) ExxonMobil ™ LDPE LD 150AC (10) |
| 6 | 60 | ExxonMobil ™ LLDPE LL 1001KI (90) ExxonMobil ™ LDPE LD 150AC (10) | DOWLEX ™ 2045.01G (75) ExxonMobil ™ LDPE LD 150AC (25) | ELITE ™ 5400GS (90) ExxonMobil ™ LDPE LD 150AC (10) |
| 7 | 60 | ExxonMobil ™ LLDPE LL 1001KI (90) ExxonMobil ™ LDPE LD 150AC (10) | ExxonMobil ™ LLDPE LL 1001KI (70) ExxonMobil ™ LDPE LD 150AC (30) | ExxonMobil ™ LLDPE LL 1001KI (70) ExxonMobil ™ LDPE LD 150AC (10) EXCEED ™ 1018KB (20) |

Example 2

Example 2 demonstrates the effect of using the first polyethylene, optionally in a blend with the second polyethylene, in the outer layer as lamination skin on low-temperature bag drop performance of the three-layer Sample 1 of the inventive film. Sample 8 was provided as a three-layer comparative film, prepared with a different lamination skin layer made by a blend of ExxonMobil™ LLDPE LL 1001KI $C_4$-LLDPE resin (ExxonMobil Chemical Company, Houston, Tex., USA) and ExxonMobil™ LDPE LD 150AC LDPE resin (ExxonMobil Chemical Company, Houston, Tex., USA) but otherwise identical in terms of layers' compositions and the film's overall thickness, compared to inventive film Sample 1. A 45 μm three-layer film with an A/Y/A structure at a layer volume ratio of 1:2:1 was prepared for both samples and was each laminated to a polyester substrate film as defined herein. The non-breakage rate was measured by EMC method as described herein. Structure-wise formulations and test results of the film samples are shown below in Table 2.

TABLE 2

Structure-wise formulations (wt %) and non-breakage rate (%) for film samples of Example 2

| | Sample No. | |
|---|---|---|
| | 1 | 8 |
| Lamination skin | EXCEED ™ 1018KB (75) ENABLE ™ 20-05HE (25) | ExxonMobil ™ LLDPE LL 1001KI (75) ExxonMobil ™ LDPE LD 150AC (25) |
| Core | EXCEED ™ 1018KB (60) ExxonMobil ™ HDPE HTA 002 (40) | EXCEED ™ 1018KB (60) ExxonMobil ™ HDPE HTA 002 (40) |
| Sealable skin | EXCEED ™ 1018KB (75) ENABLE ™ 20-05HE (25) | EXCEED ™ 1018KB (75) ENABLE ™ 20-05HE (25) |
| Non-breakage Rate (−30° C., 2 m) | 90% | 10% |

It can be seen from Table 2 that use of a polyethylene, other than the first polyethylene in the lamination skin layer of a film, may lead to a major failure in bag drop performance, which suggests that presence of the first polyethylene, optionally in a blend with the second polyethylene, in the lamination skin layer plays an important role in improving low-temperature mechanical properties.

Example 3

Figure 3:
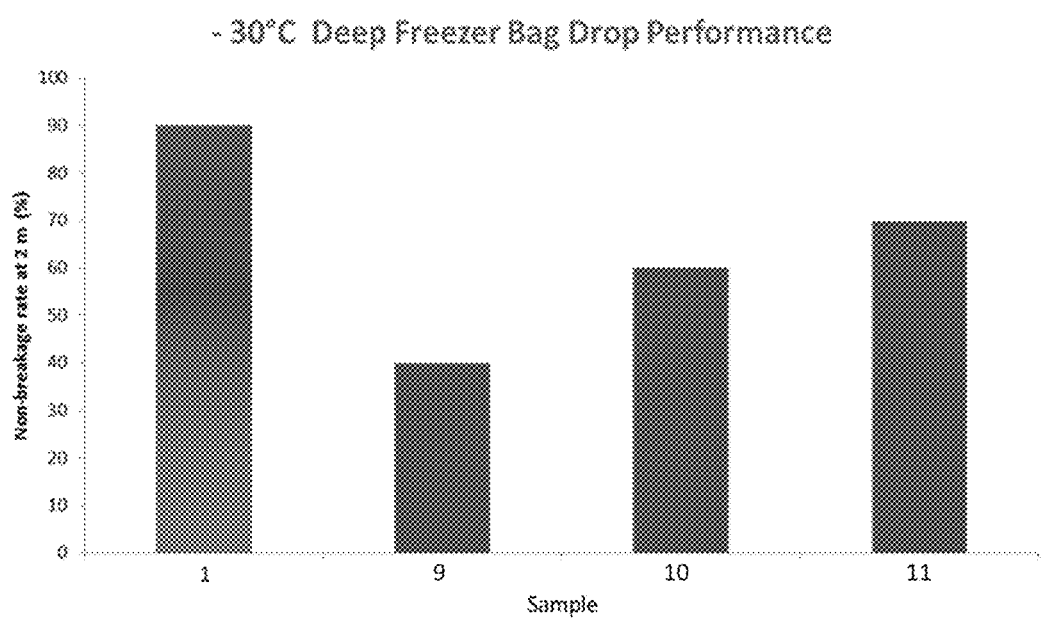
FIG. 3 depicts bag drop performance at (−30° C., 2 m) for each of the samples in Example 3.

Example 3 illustrates the effect of using the first polyethylene, optionally in a blend with the third polyethylene, in the core layer on low-temperature bag drop performance of the three-layer Sample 1 of the inventive film. Samples 9-11 were provided as three-layer comparative films, prepared with a different core layer made from ENABLE™ 27-03HH mPE (ExxonMobil Chemical Company, Houston, Tex., USA) (MIR: 56), ENABLE™ 35-05HH mPE (ExxonMobil Chemical Company, Houston, Tex., USA) (MIR: 47), and a non-commercial experimental ENABLE™ mPE-like mPE (ExxonMobil Chemical Company, Houston, Tex., USA) (MIR: 75) resins, respectively, but otherwise identical in terms of layers' compositions and the film's overall thickness, compared to the inventive film Sample 1. The POLYBATCH™ CE 505E slip agent (A. Schulman, Fairlawn, Ohio, USA) was used in each of Samples 9-11. A 45 μm three-layer film with an A/Y/A structure at a layer volume ratio of 1:2:1 was prepared for all samples and was each laminated to a polyester substrate film as defined herein. Structure-wise formulations of the film samples are shown below in Table 3. The non-breakage rate was measured by EMC method as described herein. The results are depicted in FIG. 3.

TABLE 3

Structure-wise formulations (wt %) for film samples of Example 3

| Sample No. | Lamination skin | Core | Sealable skin |
|---|---|---|---|
| 1 | EXCEED ™ 1018KB (75) ENABLE ™ 20-05HE (25) | EXCEED ™ 1018KB (60) ExxonMobil ™ HDPE HTA 002 (40) | EXCEED ™ 1018KB (75) ENABLE ™ 20-05HE (25) |
| 9 | EXCEED ™ 1018KB (75) ENABLE ™ 20-05HE (25) | ENABLE ™ 27-03HH (99) POLYBATCH ™ CE 505E (1) | EXCEED ™ 1018KB (75) ENABLE ™ 20-05HE (25) |
| 10 | EXCEED ™ 1018KB (75) ENABLE ™ 20-05HE (25) | ENABLE ™ 35-05HH (99) POLYBATCH ™ CE 505E (1) | EXCEED ™ 1018KB (75) ENABLE ™ 20-05HE (25) |
| 11 | EXCEED ™ 1018KB (75) ENABLE ™ 20-05HE (25) | Experimental ENABLE ™ mPE-like mPE (99) POLYBATCH ™ CE 505E (1) | EXCEED ™ 1018KB (75) ENABLE ™ 20-05HE (25) |

Results in FIG. 3 indicate that presence of the first polyethylene, optionally in a blend with the third polyethylene, in the core layer also contributes to improved low-temperature bag drop performance.

Therefore, based on the above data in Examples 1-3, without being bound by theory, it can be concluded that improvement in mechanical properties of a laminate film structure is determined by a specific combination of polyethylene compositions comprising the first polyethylene in each of the lamination skin, the sealable skin and the core layers.

Example 4

Figure 4:
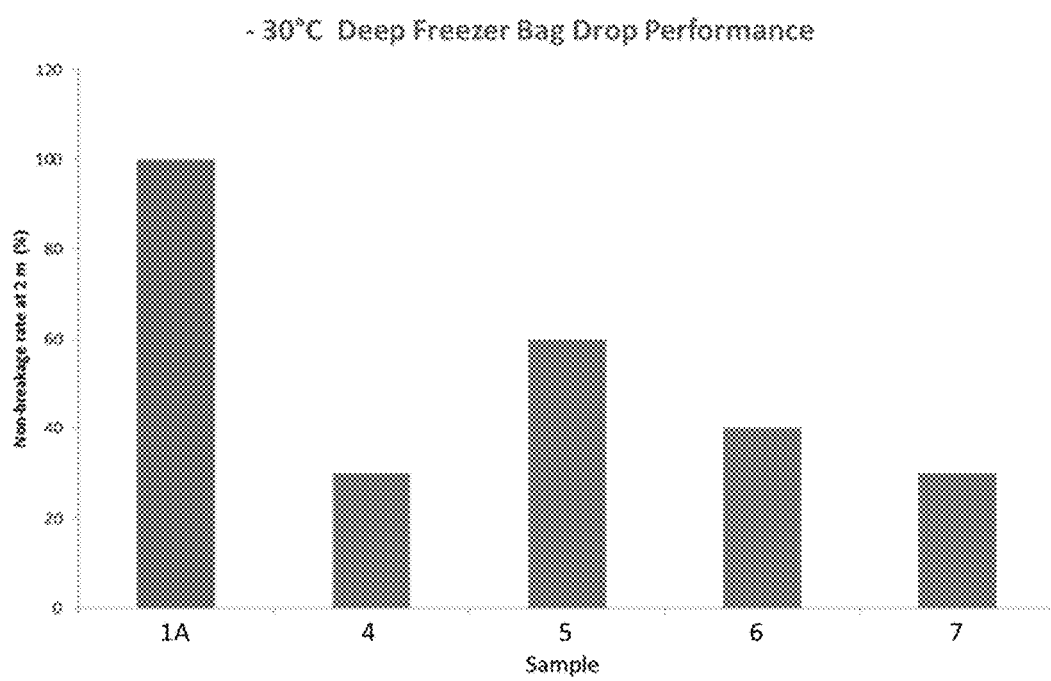
FIG. 4 depicts bag drop performance at (−30° C., 2 m) for each of the samples in Example 4.

Sample 1A was provided as another sample of the inventive film and was tested for bag drop performance with a polyethylene substrate defined herein in comparison with Samples 4-7 laminated to a polyester substrate defined herein. Sample 1A was prepared with a 45 μm three-layer A/Y/A structure at a layer volume ratio of 1:2:1 for the sealant film part and with a 40 μm five-layer A/B/X/B/A structure at a layer volume ratio of 1:2:2:2:1 for the substrate film part. A schematic representation of the film structure for Sample 1A (including the polyethylene substrate film) is shown in FIG. 1b. Structure-wise formulation of Sample 1A (including the polyethylene substrate film) is listed below in Table 4. The non-breakage rate was measured by EMC method as described herein. The results are depicted in FIG. 4.

TABLE 4

Structure-wise formulation (wt %) for Sample 1A of Example 4

| Sample 1A | Sealant | Substrate |
|---|---|---|
| Lamination skin | EXCEED ™ 1012MJ (74) ENABLE ™ 20-05HE (25) POLYBATCH ™ CE 505E (1) | EXCEED ™ 1018KB (75) ENABLE ™ 20-05HE (25) |
| Inner | — | ExxonMobil ™ HDPE HTA 002 (100) |
| Core | EXCEED ™ 1018KB (40) ExxonMobil ™ HDPE HTA 002 (60) | EXCEED ™ 1018KB (100) |
| Inner | — | ExxonMobil ™ HDPE HTA 002 (100) |
| Sealable skin | EXCEED ™ 1012MJ (74) ENABLE ™ 20-05HE (25) POLYBATCH ™ CE 505E (1) | EXCEED ™ 1018KB (75) ENABLE ™ 20-05HE (25) |

As depicted in FIG. 4, the inventive film may display an even more outstanding low-temperature mechanical profile with a polyethylene substrate, preferably at a 100% non-breakage rate, than that achieved with a polyester substrate (see Example 1), not to mention when compared with the conventional $C_4$-LLDPE, $C_8$-LLDPE and $C_8$-mLLDPE based films.

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A multilayer film, comprising two outer layers and a core layer between the two outer layers, wherein each of the two outer layers comprise from about 60 wt % to about 80 wt % of a first polyethylene and from about 40 wt % to about 20 wt % of a second polyethylene, based on the total weight of each outer layer, and the core layer comprises from about 40 wt % to about 60 wt % of a first polyethylene and from about 60 wt % to about 40 wt % of a third polyethylene, based on the weight of the core layer, wherein:
   (i) the first polyethylene is derived from ethylene and one or more $C_3$ to $C_{20}$ α-olefin comonomers, and is a metallocene polyethylene (mPE) having a density of about 0.910 to about 0.940 g/cm$^3$, a melt index (MI), $I_{2.16}$, of about 0.1 to about 15, a molecular weight distribution (MWD) of about 1.5 to about 5.5, and a melt index ratio (MIR), $I_{21.6}/I_{2.16}$, of about 10 to about 25;
   (ii) the second polyethylene is derived from ethylene and one or more $C_3$ to $C_{20}$ α-olefin comonomers, and has a density of about 0.915 to about 0.940 g/cm$^3$, an MI, $I_{2.16}$, of about 0.1 to about 5, an MWD of about 2.5 to about 5.5, and an MIR, $I_{21.6}/I_{2.16}$, of greater than 25 to about 100; and
   (iii) the third polyethylene has a density of about 0.940 g/cm$^3$ to about 0.965 g/cm$^3$;
   wherein the multilayer film has at least one of the following properties: (i) a non-breakage rate (EMC method) of about 60% to about 100% when laminated to a polyester substrate film; and (ii) a non-breakage rate (EMC method) of about 60% to about 100% when laminated to a polyethylene substrate film.

2. The multilayer film of claim 1, wherein the multilayer film has at least one of the following properties: (i) a non-breakage rate (EMC method) of about 100% when laminated to a polyester substrate film; and (ii) a non-breakage rate (EMC method) of about 100% when laminated to a polyethylene substrate film.

3. The multilayer film of claim 1, further comprising a substrate film comprising:
(a) two substrate outer layers and a substrate core layer between the two substrate outer layers, wherein each of the two substrate outer layers and the substrate core layer comprises a polyethylene derived from ethylene and one or more $C_3$ to $C_{20}$ α-olefin comonomers, wherein the polyethylene has a density of about 0.910 to about 0.940 g/cm$^3$, an MI, $I_{2.16}$, of about 0.1 to about 15, an MWD of about 1.5 to about 5.5, and an MIR, $I_{21.6}/I_{2.16}$, of about 10 to about 50; and
(b) two substrate inner layers, each having a density of at least about 0.003 g/cm$^3$ higher than that of the outer layer on the same side of the core layer, wherein each substrate inner layer is between the substrate core layer and each substrate outer layer.

4. The multilayer film of claim 3, wherein the two substrate outer layers each further comprises a polyethylene derived from ethylene and one or more $C_3$ to $C_{20}$ α-olefin comonomers, wherein the polyethylene has a density of about 0.910 to about 0.945 g/cm$^3$, an MI, $I_{2.16}$, of about 0.1 to about 15, an MWD of about 2.5 to about 5.5, and an MIR, $I_{21.6}/I_{2.16}$, of about 25 to about 100.

5. The multilayer film of claim 1, further comprising a substrate film comprising at least one of biaxially oriented polyester, biaxially oriented polypropylene, and biaxially oriented polyamide.

6. The multilayer film of claim 1, wherein the two outer layers are identical.

7. The multilayer film of claim 1, wherein the volume ratio between one of the outer layers and the core layer is about 1:1 to about 1:4.

8. A package comprising the multilayer film of claim 1.

* * * * *